(No Model.)  3 Sheets—Sheet 1.

J. E. OFFUTT.
DETACHABLE HAY RAKE AND TEDDER.

No. 319,612. Patented June 9, 1885.

Attest.
Edwin L. Bradford
Jos. H. Hunter

Inventor.
Joseph E. Offutt
By Goodwin & Simmes
his Attys.

(No Model.)
3 Sheets—Sheet 2.
J. E. OFFUTT.
DETACHABLE HAY RAKE AND TEDDER.
No. 319,612.
Patented June 9, 1885.
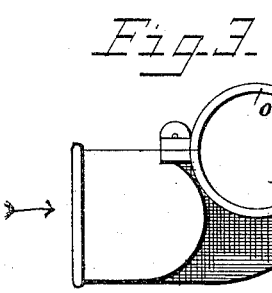
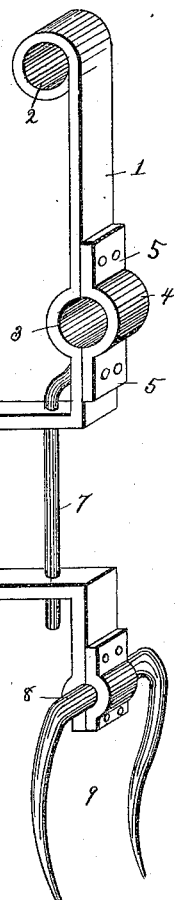
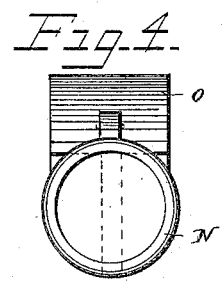
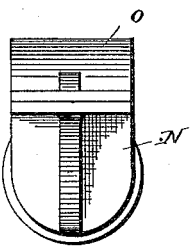
WITNESSES
Edwin L. Bradford
E. J. Webster.
INVENTOR
Joseph E. Offutt.
By Tauelmin & Jennes
his Attorneys.

(No Model.)   3 Sheets—Sheet 3.

J. E. OFFUTT.
DETACHABLE HAY RAKE AND TEDDER.

No. 319,612.   Patented June 9, 1885.

WITNESSES
Edwin S. Bradford
W. H. Wills

INVENTOR
Joseph E. Offutt
By Faulkner & Semmes
his Attys.

UNITED STATES PATENT OFFICE.

JOSEPH E. OFFUTT, OF SPRINGFIELD, OHIO, ASSIGNOR TO JOSEPH W. THOMAS, OF SAME PLACE.

DETACHABLE HAY RAKE AND TEDDER.

SPECIFICATION forming part of Letters Patent No. 319,612, dated June 9, 1885.

Application filed November 20, 1884. (No model.)

*To all whom it may concern:*

Be it known that I, JOSEPH E. OFFUTT, a citizen of the United States, residing at Springfield, in the county of Clark and State of Ohio, have invented certain new and useful Improvements in Detachable Hay Rakes and Tedders, of which the following is a specification, reference being had therein to the accompanying drawings.

This invention relates to certain new and useful improvements in hay rakes and tedders; and it has for its objects, first, to provide a main frame and a tedder-frame adapted to be detachably connected therewith, whereby it may be removed and rake mechanism substituted therefor; and, second, to provide suitable bearings on the main frame to receive the tedder-frame at a point below the axis of the supporting-wheels, whereby when the rear end of the tedder-frame is elevated it will oscillate from a center eccentric to said axis, and thereby break the engagement of the driving mechanism carried by the supporting-wheels with the tedder-shaft.

Figure 1:
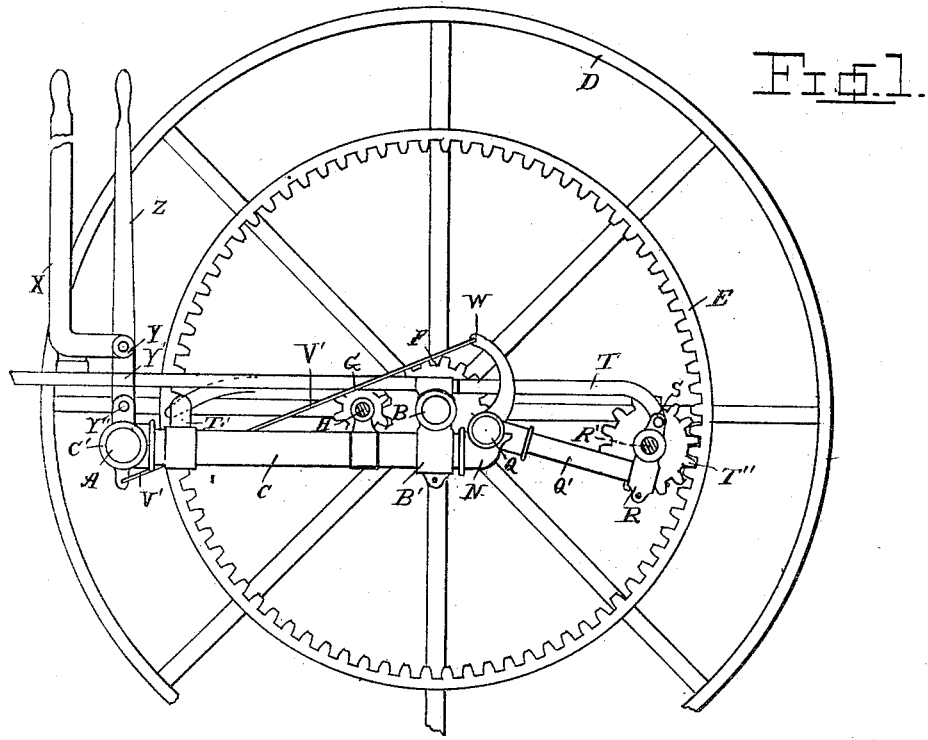
Figure 2:
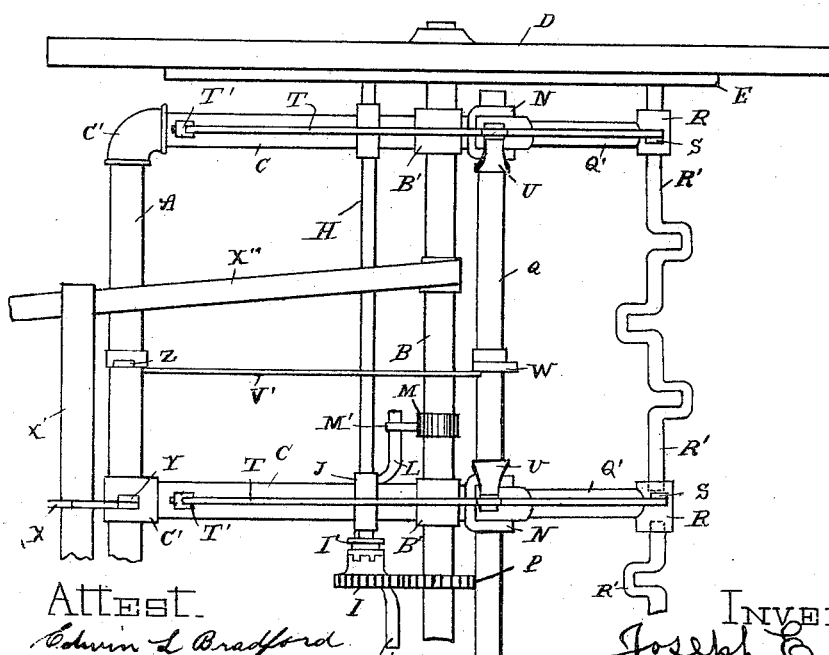
Figure 6:
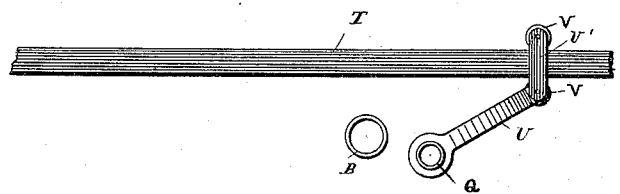
Figure 7:
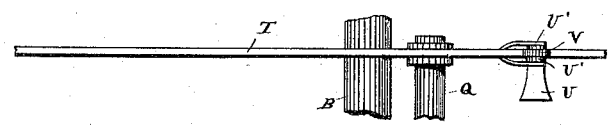
Figure 9:
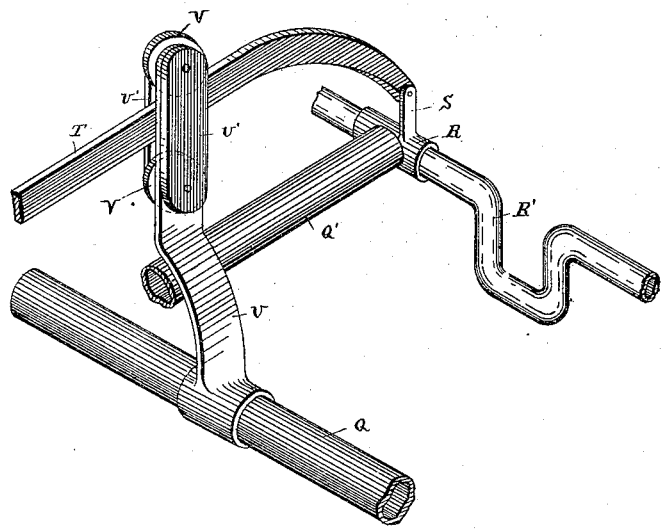

In the accompanying drawings, forming a part of this specification, and on which like letters of reference indicate similar or corresponding features, Figure 1 represents a side elevation of my invention with one of the supporting-wheels removed; Fig. 2, a plan view thereof; Fig. 3, a side elevation of the coupling for connecting the tedder or rake frame with the main frame; Fig. 4, a front view of the same, looking in the direction of the arrow in Fig. 3; Fig. 5, a rear view thereof; Fig. 6, a side elevation of the roller-lock and bar for holding and enabling the tedder-frame to be raised; Fig. 7, a plan view thereof; Fig. 8 a perspective view of my improved tedder-fork arm, and Fig. 9 a perspective view of a portion of the tedder-frame, one of the supporting-bars, and roller-locks.

The frame of my improved interchangeable hay rake and tedder is preferably constructed of tubing, and consists of the forward cross piece or tube, A, and the tubular side and intermediate pieces C, connected to the forward piece by the coupling C', and to the tubular axle B through the couplings B', screw-threads being provided in the couplings and on the several pieces, so as to form a means of connection. The supporting-axle B is mounted at each end in the wheels D, of any improved construction, and the wheels are provided with interiorly-cogged rings E, which, as will presently appear, through the medium of other instrumentalities, impart action to the tedder-forks.

The rear ends of the pieces C are provided with couplings N, which fit over the said ends and are preferably screwed thereon. The upper sides of these couplings are cut away to form a semicircular recess, N', constituting half of the journal-bearing, and are provided with caps O, secured thereto in any convenient manner, so as to constitute the remainder of the bearing. Within the bearings thus formed I mount a tubular bar, Q, which constitutes the forward cross-piece of the tedder-frame proper. To this bar Q are connected the side and intermediate tubular pieces Q', constituting the remaining portions of the tedder-frame, the rear ends of the said side and intermediate pieces being provided with blocks R, having apertures formed therein, whereby they constitute journal-bearings for the divided crank-shaft R'. Extending from these blocks are lugs S, to which are pivotally connected the tedder-frame-supporting bars T, the forward ends of which are slightly curved downward and passed through slotted standards T', secured to the forward portions of the side and intermediate pieces of the main frame of the machine. These bars T are supported at a point intermediate their ends by means of the curved arms U, secured rigidly upon the tubular bar Q, and extending at their upper ends somewhat over the couplings N. To the said ends of these arms are connected the roller-locks, which are adapted to grasp the bars T, and which consist of the strips U', pivotally connected to the arms U, and provided at their upper and lower ends with the interposed rollers V, whereby when the arms U are actuated in the arc of a circle, as will presently appear, the rollers will be caused to firmly hold and impinge against the upper and lower edges of the said bars T.

Also fixed rigidly to the bar Q is the upwardly-extending arm W, to which is attached one end of the rod V', the other end being connected with the lower extremity of the lever Z, this lever being formed with a collar, which embraces the forward piece, A, of the main frame, as seen in Fig. 2.

The letter R' indicates the respective sections of the tedder-shaft, the same being provided with a number of cranks, as usual; and its sections are mounted in the bearings formed in the blocks R. The outer ends of each section are provided with pinions T'', which intergear with the cogged rings E, by which rotary motion is imparted to the tedder-shaft.

It will be observed that the point of support—namely, the couplings N—is below the center or axis of the rings E; therefore, by a rearward thrust of the lever Z, the said pinions, through the rod V', arm W, tubular piece Q, the arms U, the roller-locks, and the bars T will be elevated and moved in the arc of a circle the center of which, as above observed, being eccentric to that of the said rings, will break engagement between the pinions and the rings. During this elevation of the rear portion of the tedder-frame the forward ends of the bars T slide through the slotted standards T'.

To raise and lower the forward part of the main frame, or to adjust that frame with relation to the ground, the lever X, pivotally mounted upon the cross-piece X' of the shaft X'', is connected at Y by a link, Y', to the forward portion of such frame at Y''. A suitable segment-plate and detent may be employed to maintain the lever in any set position.

When it is desired to use the machine as a rake, the tedder-frame is lifted in the manner just described, the bar Q detached from the couplings, and the supporting-wheels D removed, and the frame then lifted clear of the machine, the rod V' being first detached from the arm W. When the tedder mechanism is so removed, a rake mechanism is substituted, as shown in an application, No. 153,248, filed by me on the 19th day of January, 1885.

The dump-shaft H and its several co-operative devices perform no function when the machine is used as a tedder, but are brought into operation when it is used as a hay-rake, rotary motion being imparted to that shaft through the pinion G and cog-wheel F on one of the supporting-wheels D. It will also rotate the supporting-axle B, through the medium of the cog-wheel P and the pinion I, the operator first depressing the end j of the lever L, so as to effect an engagement of the clutch I' with the inner face of the pinion I. When this is done, the said axle begins to rotate, and through the devices, also appearing in the application above alluded to, the brake-teeth are elevated. When the projection M' of the collar M, which is secured to this axle, strikes the opposite end of the lever L, it will depress the same and break the engagement of the clutch I' and the pinion I, whereby further rotation of that axle will be stopped, and the gravity of the tines cause them to drop down to the ground. Thus it will be observed that a self-dump is effected, and an automatic return of the tines to their work brought about.

As represented in Fig. 8 of the drawings, my improved tedder tooth or arm consists of the strip 1, constructed of strong yielding material, such as and preferably of steel. Near or at the upper end of the strip or bar it is provided with an eye, 2, which is adapted to form a means of connection with the usual pivoted guide-arms which control the movements of the upper ends of the fork-arms, this eye being conveniently formed by bending the strip into circular form, as indicated.

At the point designated 3 the strip is provided with a semicircular depression, constituting one part of the bearing which receives the crank-shaft of the machine. The counterpart of this bearing is formed by a similarly-bent plate, 4, having perforated lips 5, whereby it is detachably connected with the strip 1.

The numeral 6 indicates a semicircle, the arch or bend formed in the body of the said strip, the object of the same being to afford a highly-yielding capacity to the arm, in order to render the tines capable of instantly giving to any obstruction or unevenness of the ground. The movement which results from such contact is substantially in the direction of the length of the strip, the tines springing forward or toward the crank-shaft. In order to prevent any backward or forward movement of the tines, I have added the pin or rod 7, the same being firmly secured to the strip above the arch and passing through apertures in the upper and lower portions of the arch, thus giving lateral rigidity to the structure, and yet allowing of unobstructed longitudinal contraction and expansion. The lower end of the strip is provided with a similar bearing, 8, to the bearing constructed at the point 3, and this lower bearing serves the purpose of receiving and holding the tines 9.

I have described, in addition to my improvements in hay-tedders, certain improvements in hay-rakes. This I have done in order to make clear the interchangeability of the rake and hay tedder attachments. The features, however, relating specifically to the hay-rake form the subject of another application filed by myself on the 19th day of January, 1885.

Having thus fully described my invention, what I claim as new, and desire to secure by Letters Patent, is—

1. In a hay-tedder, the combination, with the supporting-wheels, the main frame having rearwardly-extending side and intermediate pieces, and the couplings secured thereto below and in rear of the axis of said wheels, of the detachable frame consisting of a transverse shaft mounted in said couplings and of side and intermediate pieces secured thereto and the divided or sectional tedder-shaft mounted in the rear portion of the tedder-frame.

2. In a hay-tedder, the combination, with the main frame having rearwardly-extended side and intermediate pieces and the supporting-wheels having cogged rings, of the tedder-frame having like pieces connected to a transverse shaft mounted in couplings secured to said extensions, the divided tedder-shaft, each portion having a pinion adapted to intermesh with one of the cogged rings, the supporting-bars connected to the main and tedder frames, the arms which engage said bars, and the devices for actuating said arms.

3. In a hay-tedder, the combination, with the main frame having side and intermediate pieces provided with slotted standards and rearward extensions, of the tedder-frame having like pieces connected to the transverse shaft pivotally connected with said extensions, the arms mounted on said transverse shaft, the roller-locks, and the supporting-bars with which they engage, said bars being connected to the main and tedder frames, and the lever rod and arm for elevating the tedder-frame.

4. In a hay-tedder, the combination, with the main frame and the tedder-frame pivotally connected thereto, of the supporting-bars connected to both frames, the arms, and the roller-locks engaging with said bars.

5. In a hay-tedder, the tedder-arm constructed of yielding material and provided with an arch whereby it is made capable of longitudinal contraction and expansion.

6. In a hay-tedder, the tedder-arm constructed of yielding material and provided with an arch and a guide-pin, whereby it is made capable of longitudinal contraction and expansion and prevented from lateral springing.

7. In a hay-tedder, the tedder-arm constructed of thin steel and provided with an arch intermediate its ends, and a guide-pin rigidly secured to the arm above the arch and loosely fitted into and through the arch.

In testimony whereof I affix my signature in presence of two witnesses.

JOSEPH E. OFFUTT.

Witnesses:
  C. W. H. BROWN,
  M. P. CALLAN.